May 4, 1943.  F. D. JONAS  2,318,077
SUSPENSION FILE
Filed Feb. 7, 1942   3 Sheets-Sheet 3

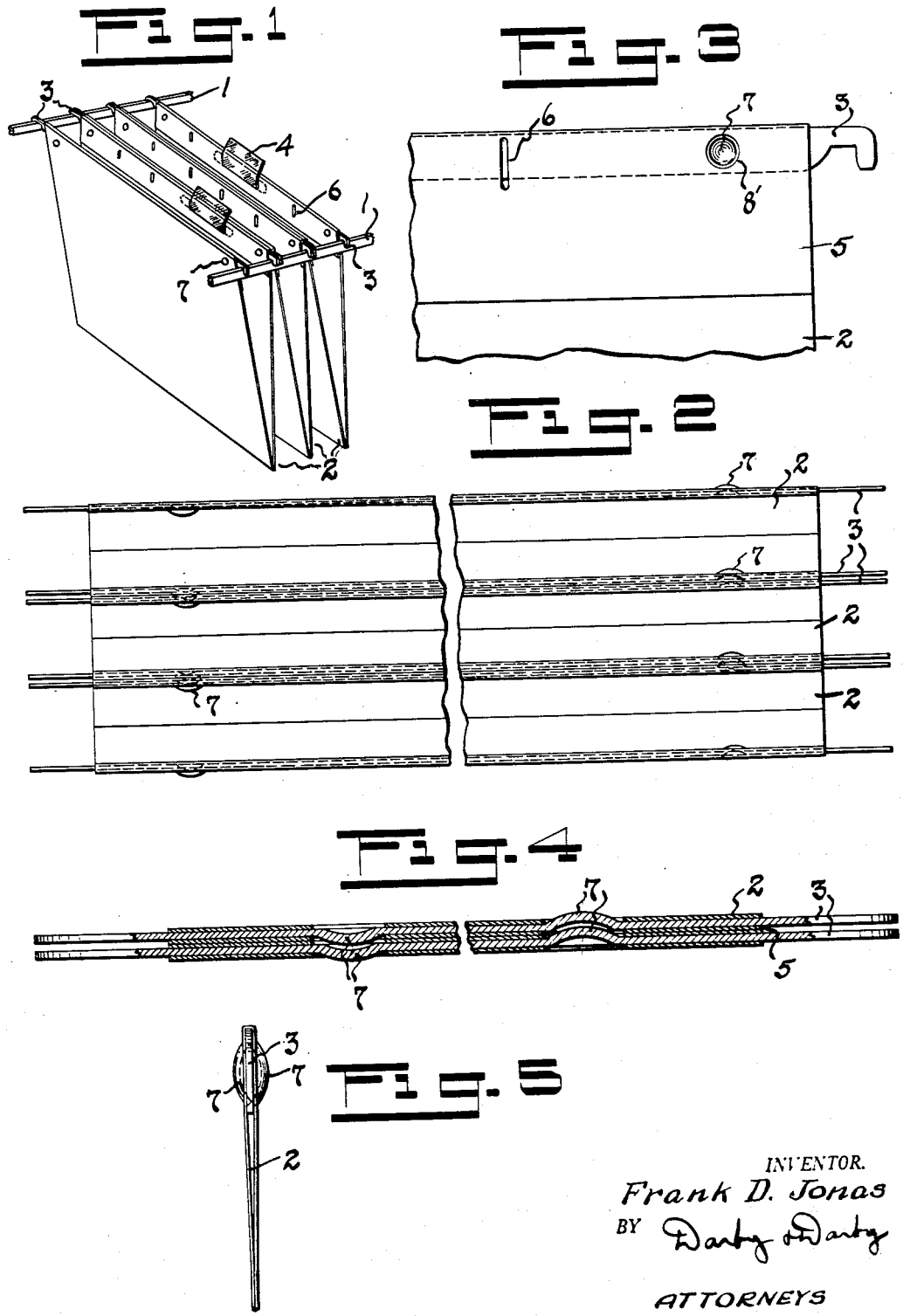

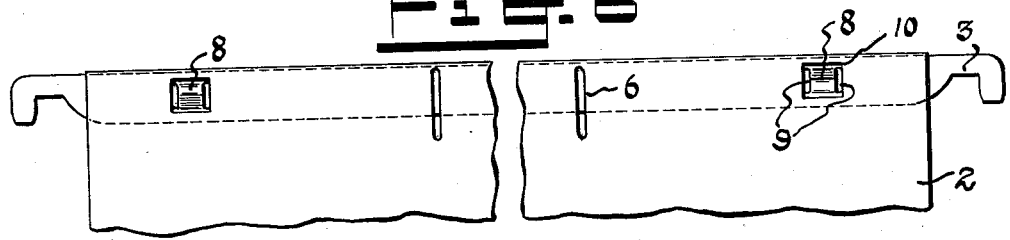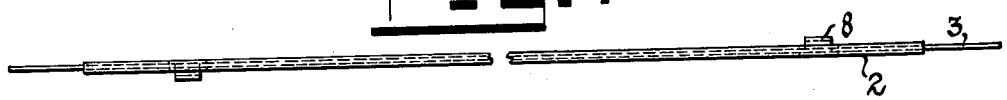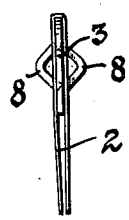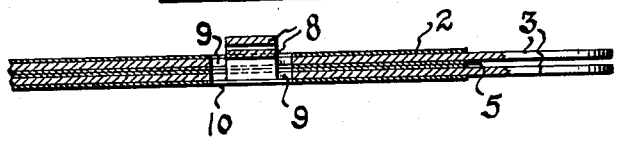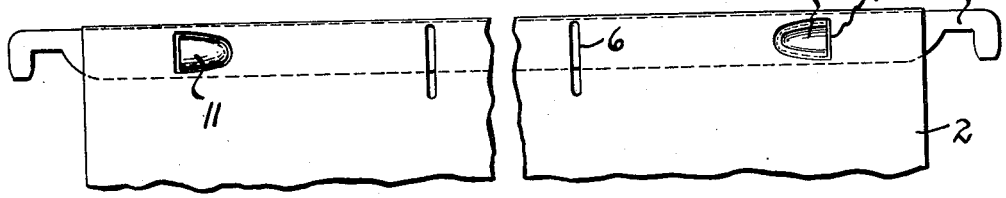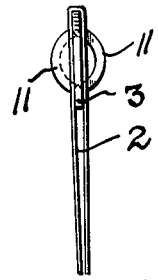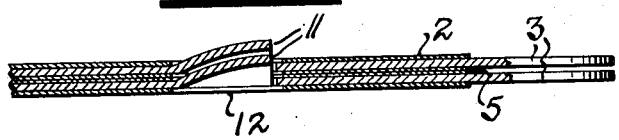

INVENTOR.
*Frank D. Jonas*
BY *Darby & Darby*
ATTORNEYS

Patented May 4, 1943

2,318,077

UNITED STATES PATENT OFFICE 2,318,077

SUSPENSION FILE

Frank D. Jonas, East Williston, N. Y., assignor to Oxford Filing Supply Co., Brooklyn, N. Y., a partnership Application February 7, 1942, Serial No. 429,855

13 Claims. (Cl. 129—16.7)

This invention relates to improvements in filing devices of the suspension type wherein a plurality of V-shaped files forming filing pockets, filing cards or divider elements are supported from their top edges on rails by means of suspension bars, ears, arms or shoulders.

This invention relates to improvements in structural embodiments of filing elements to obtain interlocking or nesting action between the suspension or hanger rods or their equivalent as they ride on supporting rails to cause them to register or align either in a vertical plane or in a horizontal plane, or in both planes. An advantage of this construction is that it prevents one or more of the file elements from riding up under pressure encountered in the normal movement of the files on the supporting rods during use. Another advantage of the construction disclosed is to effect transverse alignment of the individual file elements which is of particular importance in certain uses where indexing marks must be accurately positioned relatively to each other in a set of these elements.

In accordance with this invention which is illustrated in several embodiments, it is possible to maintain vertical alignment, horizontal alignment, or alignment in both directions.

Heretofore some effort has been made to accomplish the objects of this invention by means of special hooked ends and like devices for co-operation with the supporting rails which have the undesirable features of being expensive in construction, requiring excessive manipulation in engaging and disengaging the pockets with the rails, and in adding undue bulk or thickness to a series of such files.

In accordance with this invention the objects thereof are secured by means of constructions which are exceedingly simple, which do not require any additional or separable parts, and which add no appreciable bulk or thickness to the filing folders.

The full objects of this invention will be apparent from the following description of several embodiments thereof when taken with the attached drawings illustrating them.

This invention resides substantially in the combination, construction, arrangement and relative location of parts, all as will be described in detail below.

In the accompanying drawings,

Figure 1 is a perspective view of a portion of a suspension filing system of the type for which this invention is adaptable;

Figure 2 is a top plan view of a plurality of V-shaped filing pockets for a suspension system showing one embodiment of the invention;

Figure 3 is an enlarged detail, front elevational view of the inside face of the rear wall of one of the file pockets;

Figure 4 is a horizontal, cross-sectional, longitudinal view of a single file pocket in closed position, the section being taken at about the longitudinal center of the suspension bar;

Figure 5 is an end elevational view of the structure of Figure 4;

Figure 6 is a front elevational view of a modified form of construction;

Figure 7 is a top plan view thereof;

Figure 8 is an end elevational view thereof;

Figure 9 is an enlarged cross-sectional view through the longitudinal center of a pair of suspension bars of the structure of Figure 6;

Figure 10 is a front elevational view of a further modified construction in accordance with this invention;

Figure 11 is a top plan view thereof;

Figure 12 is an end elevational view thereof;

Figure 13 is a sectional view similar to that of Figures 4 and 9;

Figure 14:
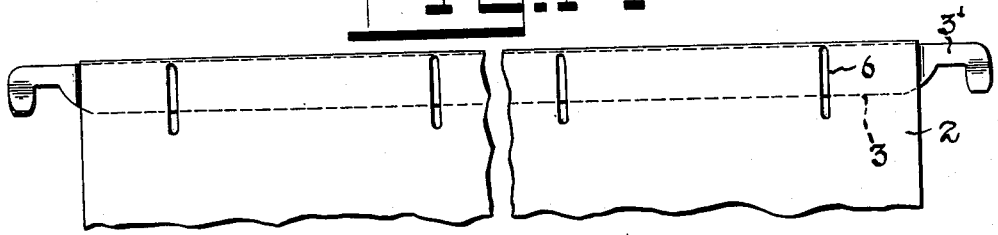
Figure 14 is a front elevational view of a further modified construction.

The suspension type of filing system is well known, and as illustrated in Figure 1, it includes a pair of side rails or supports 1 which may be mounted in or form a part of a filing cabinet drawer. The filing folders 2 are suspended in vertical planes from the rails 1 by means of suspension bars or hangers 3 which are attached to the top free edges of the filing folders. The ends of the bars or hangers are hooked shaped so as to fit over the top edges of the rails and are slidably mounted thereon. As illustrated at 4 suitable index tab structures may be permanently attached to each folder, or as illustrated, detachably mounted thereon by means of ears which project into suitably positioned slots 6.

In one practical form each filing folder consists of a single sheet of suitable material folded along a medial line to provide a V-shaped pocket as illustrated. As shown in Figure 3, the top free edge of each wall of the pocket is folded over and inwardly to provide a flap which is secured to the inner face of each wall, as indicated at 5, so as to leave a passage or channel between the two plies thus formed by the line of fold. The inner ply as illustrated at 6 in Figure 3 is slotted at suitable intervals so that the index tabs may be mounted therein. The hanger bars 3 which lie in these passages are made of any suitable material such as metal, fiber, Bakelite and the like, comprise thin narrow strips which may be slid endwise into the passages and of sufficient length so as to project the necessary amount at each side of the passage. The ends of the strip, as illustrated, are suitably shaped to form hooks which may ride on the rails.

In the construction of Figures 1 to 5 inclusive illustrating the first embodiment of the invention, both vertical and horizontal alignment is secured by forming one or more dimples 7 in the strip and cutting an aperture 8' in the associated plies of the folder wall so that the dimple lies therein when the strip is properly positioned. As is clear from Figures 4 and 5, two dimples on each strip are sufficient, one near each end and preferably, but not necessarily, facing in opposite directions. It will be seen at once that the dimples 7 serve to accurately position the strips in their passages. The advantage of having the dimples face in opposite directions is that this makes each strip symmetrical so that it may be slipped into its passage without regard to which end goes first, thus insuring that the parts may be assembled by the user without any difficulty.

As illustrated in Figure 2, when a plurality of folders are arranged in juxta-position, as they will be in use, the dimples of the respective folders nest and cause accurate alignment of the folders in all directions. With this construction the tendency for one or more of the folders to ride upwardly under pressure will be overcome. In addition the folders being aligned transversely, it is apparent that the indexing means of the various folders will remain in proper alignment.

This last feature is of importance in certain specialized forms of suspension files such as that shown in my copending application Serial No. 418,356, filed November 8, 1941. In such a system which is a combined filing and visible index system the construction just described will insure that the coding and keying commonly employed in such systems will remain accurately aligned.

In the construction shown in Figures 6 to 9 inclusive the same results are secured by means of a different construction. In this case instead of hemispherical dimples V-shaped ears or lugs 9 are struck out of the hanger bars 3 in opposite directions to form cooperating keys which nest when the folds are aligned on the rails to again provide for horizontal and vertical alignment and to insure against the riding up of the folders under pressure. As before, suitably positioned apertures 10 are provided in the associated plies of the folder walls through which the lugs 9 may project. As illustrated, the lugs 9 are defined at the sides by means of slots 9, but it will be apparent that if desired the metal need only be slit at those points providing substantially no opening.

A still further modified construction is illustrated in Figures 10 to 13 inclusive. In this case the bosses 11 on the hanger rods are shaped like a thumb nail by slitting the metal at one end and pressing it out into a curved cross section. It will be noted that the lugs thus formed face towards the opposite ends of the bar and are aligned with apertures 12 in the wall so that they may properly nest, as illustrated in Figure 13. This construction also provides for horizontal as well as vertical alignment.

The construction shown in Figures 14 to 17 inclusive is capable only of preventing the folders from riding up vertically under pressure. In this case the hooked ends 3' of the hanger bars 3 are shaped so that they will nest and form a resisting wedging action against any upward movement of the files.

Figure 15:
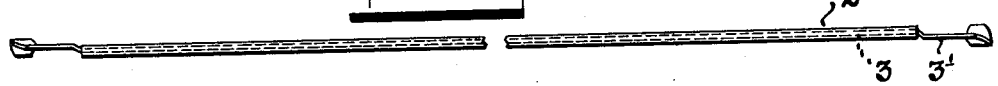
Figure 15 is a top plan view thereof.
Figure 16:
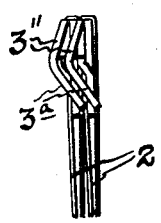
Figure 16 is an end elevational view thereof.
Figure 17:
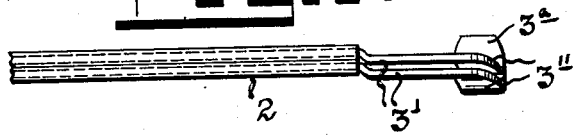
Figure 17 is an enlarged broken top plan view of a complete filing folder at one corner showing this construction.
Figure 18:
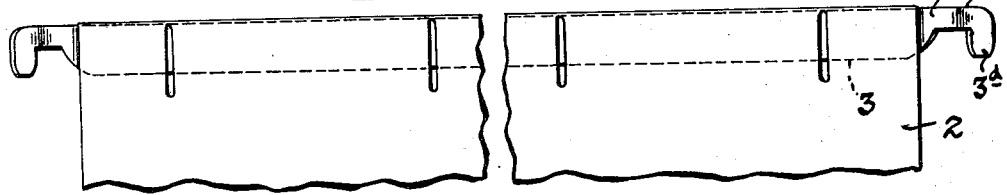
Figure 18 is a front elevational view of a final modification of this invention.
Figure 19:
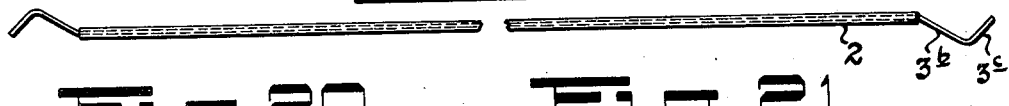
Figure 19 is a top plan view thereof.
Figure 20:
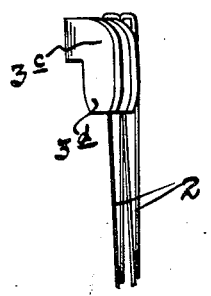
Figure 20 is an end elevational view thereof.
Figure 21:
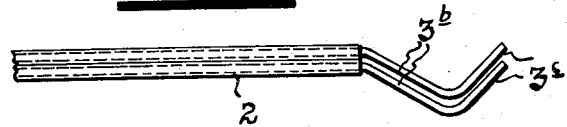
Figure 21 is an enlarged broken top plan view of the same structure.

As is clear from Figure 15 the hooked ends are first offset from the plane of the main body of the hangers, as indicated at Figure 3. The depending portions of the hooks are then bent into two converging planes. As seen from Figure 16, the upper portion 3'' inclines to the left while the lower portion 3ᵃ inclines towards the right. When a series of folders with hangers so constructed are mounted on rails the adjacent ends of the hangers of folder pairs will nest and provide inclined surfaces against which any folder which tends to rise will wedge. It will be seen that this construction does not insure against transverse movement but is a safeguard against vertical movement.

The construction illustrated in Figures 18 to 21 is a modification of that previously described and is adapted to insure transverse alignment without providing against vertical movement. In this case the hooked ends of the hangers 3 are offset in opposite directions from the main body of the strip as indicated at 3ᵇ. The terminal ends are offset in the reverse direction as indicated at 3ᶜ. This insures that the hooked ends of adjacent hangers will nest in a manner to resist transverse relative movement.

In both of the constructions illustrated in Figures 14 to 21 inclusive it will be seen that the constructions at the two ends of the hangers are the same but they face in opposite directions to again provide a symmetrical structure which does not require any particular positioning of the hangers in threading them in the passages.

In some forms of construction the offset hooked ends may be undesirable, in which event a utilitarian advantage can be gained by the use of the invention of Figures 14 to 21 inclusive by only forming one end of each hanger in accordance therewith. The other end may be left flat as in the case of the construction of the other figures. If conditions require it, only one dimple or boss 7, 9 and 11 can be used for each hanger. Likewise, it is obvious that when conditions dictate more than one form of dimple or lug may be employed on each bar or folder. It is preferable, however, to use a symmetrical construction disclosed in each case in order to insure proper nesting of adjacent hangers regardless of how they are threaded into their passages. Finally, it is likewise clear that the dimples need not face in opposite directions but may project from the same side of the hanger when conditions make this preferable.

It will be apparent from the above description that the advantages thereof are obtained without complicated structures and without additional parts. Likewise, it is important to note that these constructions do no add any additional bulk or weight to the folders which is, of course, a very desirable feature.

From the above description it will be apparent to those skilled in the art that the subject matter of this invention may be embodied in other specific physical forms, and I prefer, therefore, to be limited only as required by the appended claims and not to the embodiment selected for the purpose of illustrating that substance.

What is claimed is:

1. A suspension filing system comprising in combination a support frame, a plurality of substantially plane filing members suspended by ears from said support frame, a corresponding formation on each of said members shaped by displacement from its body plane and proportioned to provide aligning inter-nesting of contiguous filing members at said formations.

2. In a suspension filing system the combination of a support frame, a plurality of substantially plane filing members suspended by ears from said support frame, each of said members shaped to a form by displacement out of plane of a body portion, said forms being proportioned to nest without separation between the faces of contiguous filing members.

3. A suspension filing folder of the type described comprising a filing pocket formed by connected front and rear walls and hanger bars secured in the marginal edges of said walls, said bars having curved dimples formed therein so as to align and nest with each other.

4. A suspension filing folder comprising a filing pocket formed by front and rear walls, the marginal edges of said walls being folded to form passages, suspension bars in said passages, each of said bars having at least one dimple formed therein and lying entirely within an aperture in the wall structure.

5. In a suspension file the combination comprising a pair of supports, a plurality of file pockets mounted on said supports by means of attached hanger bars, each hanger bar having at least one dimple formed thereon, the dimples of adjacent hanger bars being aligned so that they nest to vertically and horizontally align the file pockets.

6. A suspension filing folder comprising a pocket formed of connected walls, said walls being folded to form passages at their marginal edges, hanger bars mounted in said passages, the ends of said bars projecting beyond the ends of the passages and being offset so as to nest with similarly shaped hangers and maintain alignment in the planes of said walls.

7. A suspension filing folder comprising a pocket formed of connected walls, said walls being folded to form passages at their marginal edges, hanger bars mounted in said passages, the ends of said bars projecting beyond the ends of the passages and being offset transversely of the longitudinal axes of the bars so as to nest with similarly shaped hangers and maintain alignment in the planes of said walls.

8. A suspension filing folder comprising a pocket formed of connected walls, said walls being folded to form passages at their marginal edges, hanger bars mounted in said passages, the ends of said bars projecting beyond the ends of the passages and being offset longitudinally of the bars so as to nest with similarly shaped hangers.

9. In a suspension filing system the combination comprising a pair of spaced supports, a plurality of file pockets each composed of connected walls, hanger bars attached to said walls for suspending the pockets from said support, said hanger bars having ends with V-shaped deformations so that each nests with the adjacent hanger bar to prevent relative transverse movement in the planes of said walls.

10. A suspension filing folder comprising a filing pocket formed by connected front and rear walls, hanger bars secured to said walls, and formations on said bars adapted to nest and thereby align said bars with each other.

11. In a suspension filing system a plurality of filing elements having means for supporting them in suspension, each of said filing elements having integral complementarily formed aligning means shaped so that when supported in suspension said aligning means nest in succession to hold the elements in alignment.

12. A suspension filing folder comprising a pocket formed of connected walls, said walls being folded to form passages at a corresponding pair of marginal edges, hanger bars slidably mounted in said passages, said bars having portions offset from the plane thereof and the adjacent walls of said passages having apertures entirely within which said portions lie for transversely aligning said bars in said passages.

13. A suspension filing folder comprising a pocket formed of connected walls, said walls being folded to form passages at a corresponding pair of marginal edges, hanger bars slidably mounted in said passages, said bars having portions offset from the plane thereof and the adjacent walls of said passages having apertures in which said portions lie for transversely aligning said bars in said passages, and said offset portions being adapted to nest with corresponding portions of other folders to interlock a series of folders in alignment.

FRANK D. JONAS.